UNITED STATES PATENT OFFICE.

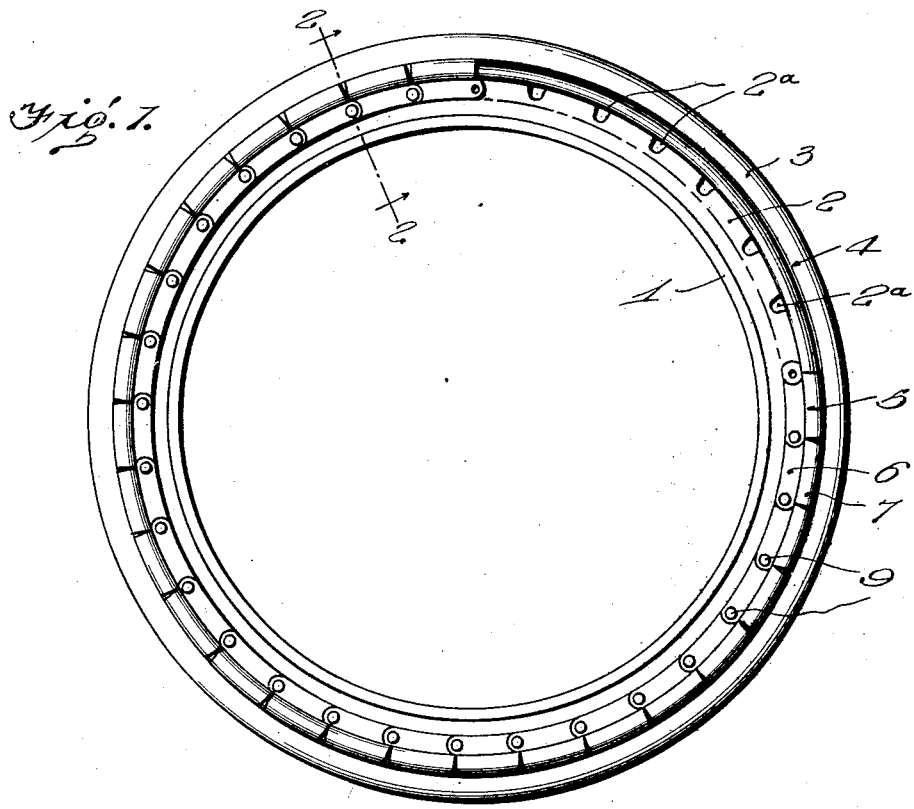

JOSEPH RANSOM PLACE, OF DETROIT, MICHIGAN.

TIRE.

1,409,771.  Specification of Letters Patent.  Patented Mar. 14, 1922.

Application filed November 22, 1920. Serial No. 425,766.

*To all whom it may concern:*

Be it known that I, JOSEPH RANSOM PLACE, a citizen of the United States, residing at Detroit, in the county of Wayne and State of Michigan, have invented certain new and useful Improvements in Tires; and I do declare the following to be a full, clear, and exact description of the invention, such as will enable others skilled in the art to which it appertains to make and use the same.

This invention relates to an improved tire for vehicles, and it has for its object to provide a novel tire which is designed to be used as a substitute for pneumatic tires and solid tires now used on trucks and other vehicles.

Another object of the invention is to provide a tire of the solid or cushion type which is strong, durable, extremely effective in operation, comparatively light in weight and inexpensive to manufacture.

A further object of the invention is to provide a tire including a rim to be placed on the felly of conventional types of wheels now on the market, together with inner and outer cushions, the first named of which is composed of comparatively soft or highly resilient rubber, being adapted to absorb all shocks to which the tire is subjected, there being novel endless flexible rings disposed on opposite sides of the meeting faces of the cushions to connect the latter together and permit relative free radial expansion and contraction and to prevent relative circumferential movement.

Other objects and advantages of the invention will be apparent during the course of the following description.

In the accompanying drawings forming a part of this specification and in which like numerals are employed to designate like parts throughout the same:

Figure 1 is a side elevation, with parts of the connecting rings removed, of a tire constructed in accordance with this invention.

Figure 2 is an enlarged transverse section taken on the line 2—2 of Figure 1, looking in the direction of the arrows.

Figure 3 is a detail view, with parts in section, of several of the links of the aforesaid connecting ring.

Referring to the drawings, wherein the preferred embodiment of the invention is clearly illustrated, it will be seen that numeral 1 designates a channel shaped rim which is such that it permits this tire to be easily and readily placed in position on the felly of conventional types of vehicle wheels. Seated in this rim is a comparatively soft rubber cushion 2, which has a plurality of circumferentially spaced transverse grooves $2^a$ formed in its outer periphery for a purpose to be hereinafter set forth. Surrounding the outer periphery of the cushion 2 is another larger and substantially hard rubber cushion 3. At this point, it may be mentioned that the cushion 2 is designed to absorb the shocks to which the tire is subjected, while the cushion 3 is designed to bear against the surface and provide a long wearing tread. Cushion 3 is provided at points opposite each other with circumferential grooves 4, which, like the transverse grooves $2^a$ serve a purpose to be hereinafter set forth.

In order to retain the cushions in position and to prevent lateral movement or displacement of the outer cushion from the inner cushion, I make use of two novel connecting rings or members, here designated as a whole by the numeral 5. These rings, as before intimated, are flexible so as to permit free radial movement of the cushions. While these rings could be of some other construction, they are preferably constructed as shown. By carefully examining the disclosure thereof, it will be seen that each ring is made up of a plurality of links 6 which, according to this invention, have hooks 7 formed on one longitudinal edge, the free end of these hooks being received in said grooves 4 to retain the outer cushion in proper position. It is desirable to so construct each link that it includes an offset portion 8 at one end, this offset portion overlapping the adjacent flat end of the next link. With this construction and arrangement, it will be seen that a plurality of circumferentially spaced lugs will be had, these lugs being adapted to extend into the ends of the transverse recesses or grooves $2^a$ to prevent relative circumferential movement of the two cushions. Bolts 9 are passed through the overlapped ends of the links to retain the latter in effective position, these bolts being seated in the above named grooves $2^a$ and assisting, in conjunction with the above named lugs, to prevent relative circumferential movement of the two cushions.

In use, it will be seen that the outer or comparatively hard cushion will bear on the ground and will serve as an effective tread for the tire. The other cushion, due to its high degree of elasticity, will effectively absorb all shocks and will render the tire quite as efficient in operation as a pneumatic tire. Rings 5, due to their flexibility, will permit free radial expansion of and contraction of the two cushions and will also assist in producing an effective tire. The retaining bolts 9 together with the offset ends of the links, prevent relative circumferential movement of the cushions. Since my tire is equipped with a conventional type of rim, it will be seen that it can be advantageously used with conventional types of wheels. In addition to being highly resilient, the tire is strong, durable, comparatively light in weight and is absolutely puncture-proof.

A careful consideration of the foregoing description taken in connection with the accompanying drawings is thought to be sufficient to enable persons skilled in the art to which the invention relates, to obtain a clear understanding of the same. Therefore, a more lengthy description is deemed unnecessary.

Since probably the best results may be obtained with the construction and arrangement herein shown and described, this construction and arrangement is taken as a preferred embodiment of the invention. However, I wish it to be understood that various minor changes in the shape, size, and arrangement of parts may be resorted to without departing from the spirit of the invention or the scope of the subjoined claims.

I claim:

1. A vehicle tire comprising inner and outer annular cushions, the first named cushion being provided at circumferentially spaced points with recesses, and flexible connecting rings for the cushions arranged on the opposite sides of the latter, being equipped with a plurality of circumferentially spaced internal anchoring lugs fitting into the recesses to prevent relative circumferential movement of said cushions.

2. A tire comprising a rim adapted for placement on the felly of a vehicle wheel, a comparatively soft rubber annular cushion secured to the rim, being provided in its periphery with a plurality of circumferentially spaced transverse channels, a second larger and comparatively hard tread cushion surrounding and resting on the outer periphery of said first cushion, said second cushion having opposed circumferential grooves formed in its sides, a pair of endless connecting rings disposed on opposite sides of said cushions, being composed of a plurality of links having hooks extending into said grooves, each link being offset at one end and overlapping the adjacent flat end of the next link, said offset portions extending into the aforesaid channels, and retaining bolts passing through the overlapped ends of the links and seating in said channels.

In testimony whereof I have hereunto set my hand.

JOSEPH RANSOM PLACE.